United States Patent [19]

Christo

[11] 4,325,405
[45] Apr. 20, 1982

[54] VALVE BOX ASSEMBLY

[76] Inventor: C. Louis Christo, 24 Hingham Rd., North Grafton, Mass. 01536

[21] Appl. No.: 115,004

[22] Filed: Jan. 24, 1980

[51] Int. Cl.³ .......................... F16L 5/00; E02D 29/14
[52] U.S. Cl. ..................................... 137/371; 137/370; 52/20
[58] Field of Search ...................... 52/19, 20, 220, 221; 285/184, 298, 302; 137/363–371

[56] References Cited

U.S. PATENT DOCUMENTS

| | | | |
|---|---|---|---|
| 2,749,999 | 6/1956 | Schmid | 285/298 |
| 2,827,914 | 3/1958 | Alters | 137/371 |
| 2,828,762 | 4/1958 | Swank | 137/371 |
| 4,194,769 | 3/1980 | Bram | 285/184 |
| 4,255,909 | 3/1981 | Söderström | 52/20 |

FOREIGN PATENT DOCUMENTS

| | | | |
|---|---|---|---|
| 78974 | 9/1976 | Australia | 52/20 |
| 2241222 | 3/1973 | Fed. Rep. of Germany | 52/20 |

Primary Examiner—A. Michael Chambers
Attorney, Agent, or Firm—Blodgett & Blodgett

[57] ABSTRACT

Valve box assembly having a valve box, having a riser threadingly mounted in the valve box for fine height adjustment, and having a cover for the riser.

9 Claims, 10 Drawing Figures

VALVE BOX ASSEMBLY

BACKGROUND OF THE INVENTION

In a typical water or gas service installation, the main water or gas line is connected to a corporation valve adjacent the main line and through a service valve to a residential water or gas system. The service valve is located under a curb or sidewalk and a valve box extends from the service valve to the surface, so that the surface valve can be turned "on" and "off" by means of an elongated wrench or a key. The valve box may appear at the surface either at the sidewalk or at the roadway, but in either case it must be flush with the surface. Thus, the length of the valve box must be carefully adjusted not only during the initial installation, but also each time a new layer of material is added to the surface around the top of the valve box.

During the initial installation of a valve box, a two-piece, telescoping assembly is usually provided to permit adjustments to compensate for variations in depth between the valve and the surface. Since the telescoping action occurs well below the surface, further adjustment is usually impossible after the initial installation has been made. The telescoping valve box may be of the slip-type in which one member is slidably mounted within the other and in which means is provided to lock the members together after a desired length is achieved. The telescoping valve box may also be of the screw-type in which one member is threaded onto the other.

During resurfacing operations of the street or sidewalk, the new surfce may very often lie above the top of the valve box. In such case, the top of the valve box is brought up to the level of the new surface by inserting an adapter into the top of the existing valve box, thereby increasing its overall length. These adapters have traditionally been of fixed length and available in one inch increments. Therefore, it is necessary to have available an assortment of adapters in one inch increments. Very often, the height needed to bring the top of the valve box flush with the new surface lies between two increments. In colder climates, during the winter season, ground frost may cause the valve box assembly to rise above ground level and it may remain in that position after the spring thaw. When this occurs it is necessary to excavate the valve box assembly and lower it to its original position. These and other difficulties experienced with the prior art devices have been obviated in a novel manner by the present invention.

It is therefore, an outstanding object of the invention to provide a valve box assembly which is adjustable in height during and after installation.

Another object of this invention is the provision of a valve box assembly in which fine height adjustment can be made.

A further object of the present invention is the provision of a valve box which is adjustable for tilt angle to accomodate a sloping surface.

It is another object of the instant invention to provide a valve box assembly which can be adjusted with a minimum amount of digging or excavation.

A still further object of the invention is the provision of a valve box assembly which includes a riser mounted within a valve box for fine height adjustment, a cover for closing the top of the riser and means for providing a seal between the cover and riser.

It is a further object of the invention to provide an adapter for existing valve boxes, which adapter provides for fine height adjustment of the valve box.

It is a further object of the invention to provide an adapter for existing valve boxes which is adjustable for tilt angle to accomodate a sloping surface.

It is a further object of the invention to provide an adapter for existing valve boxes which can be installed and adjusted with a minimum amount of digging.

Another object of the invention is to provide an adapter having a riser and adjusting nut for supporting the riser at the top of an existing valve box.

A further object of the present invention is the provision of an adapter having a riser adapted to receive an existing valve box cover.

With these and other objects in view, as will be apparent to those skilled in the art, the invention resides in the combination of parts set forth in the specification and covered by the claims appended hereto.

SUMMARY OF THE INVENTION

In general, the present invention has to do with a valve box assembly for street plumbing, the assembly having a tubular valve box for covering a below-ground service valve, having a riser threadingly mounted within the valve box for vertical height adjustment, and having a cover for closing the top of the riser. The invention also relates to an adapter for existing valve boxes, the adapter consisting of a nut provided with internal threads and having an annular horizontal flange adapted to rest on the upper surface of the valve box and of a riser, having external threads, which is threaded into the nut for vertical adjustment and has an upper surface for receiving the existing valve box cover.

More specifically, the nut is provided with an annular horizontal flange that rests on the upper flat surface of the valve box which normally supports the cover. The top of the riser is similar to the top of the existing valve box and includes an upper horizontal surface for supporting the valve box cover. The flange of the nut is also provided with a vertically-extending adjusting screw for adjusting the tilt angle of the riser to match a sloping surface. A modified valve box, used in original installations, is provided with an interior annular flange provided with internal threads for receiving the external threads of the riser, thereby eliminating the need for an adjusting nut.

BRIEF DESCRIPTION OF THE DRAWINGS

The character of the invention, however, may be best understood by reference to one of its structural forms, as illustrated by the accompanying drawings, in which.

BRIEF DESCRIPTION OF THE PREFERRED EMBODIMENT

Figure 1:
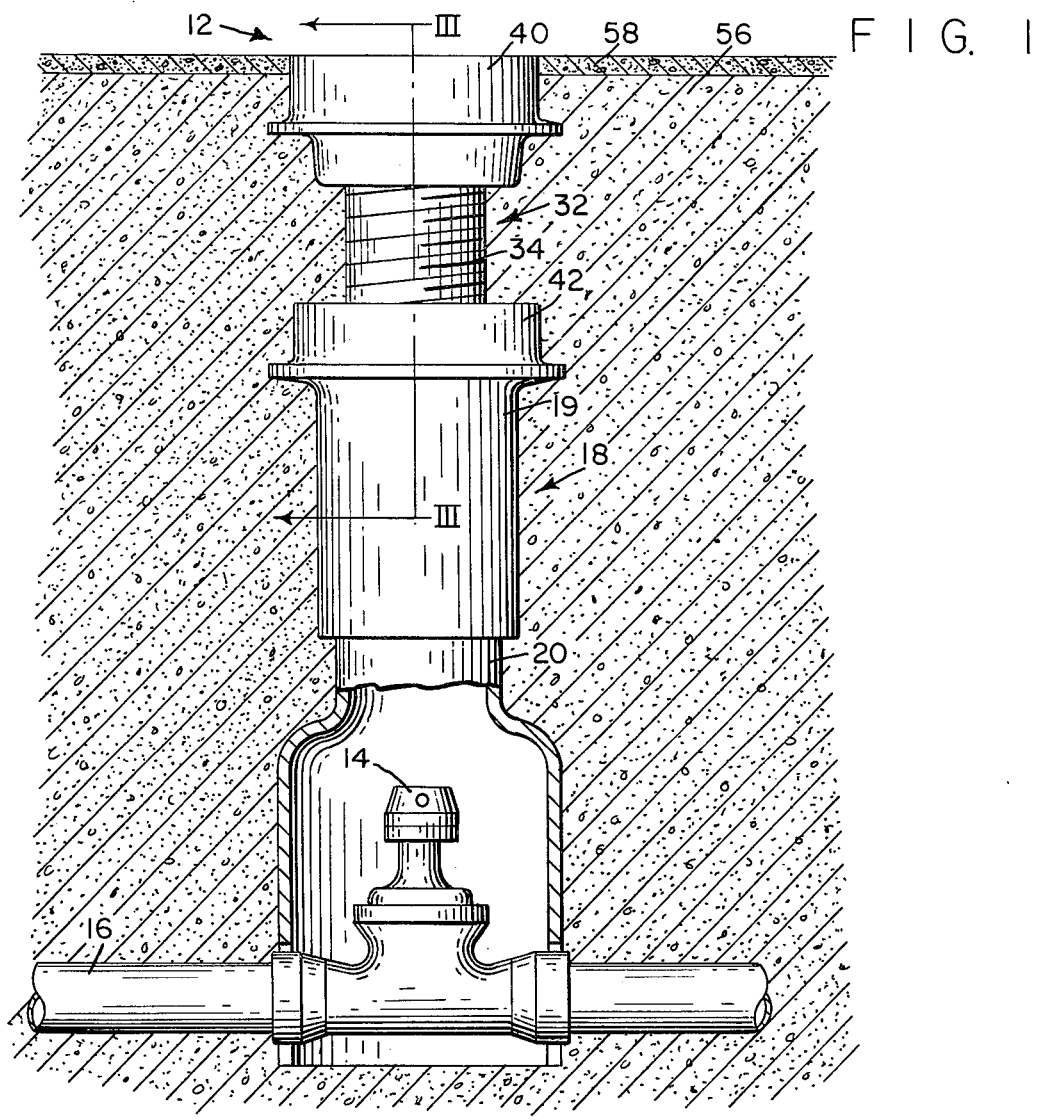
FIG. 1 is a front elevational view of a valve box assembly embodying the principles of the present invention and shown installed above a valve.
Figure 2:
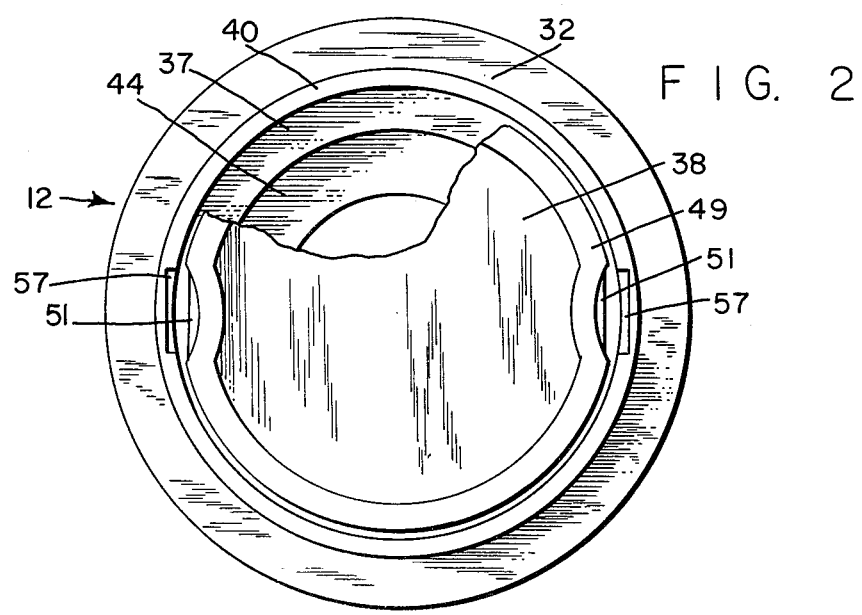
FIG. 2 is a plan view of the valve box assembly.
Figure 3:
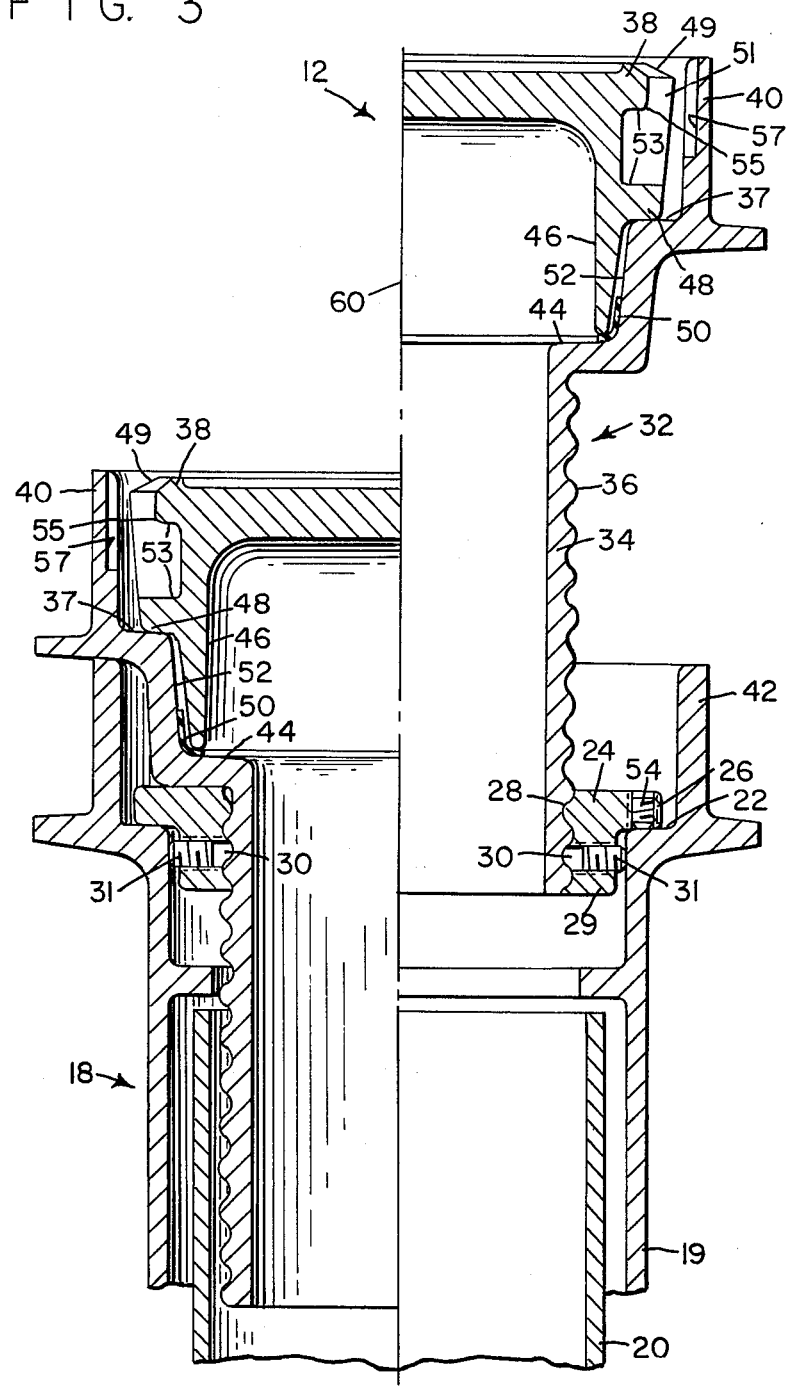
FIG. 3 is a vertical sectional view of the valve box assembly taken on the line III—III of FIG. 1.

Referring first to FIGS. 1, 2, and 3, the valve box assembly, generally indicated by the reference numeral 12, is shown in FIG. 1 as installed above a street plumbing service valve 14 connected to a water pipe 16. The pipe is connected on one side to a water main (not shown) and on the other side to a residence (also not shown). Assembly 12 includes a valve box 18 comprising a tubular upper portion 19 telescopingly mounted on a bell-bottom tubular lower portion 20 which surrounds the service valve 14. The upper portion 19 has an upper annular horizontal surface 22 (FIG. 3) for supporting the annular horizontal flange 26 of a nut 24. Nut 24 is provided with internal threads 28 and includes a tubular vertical portion 29 that extends into the lower portion 19 of the valve box. Portion 29 is provided with horizontal apertures 30 for receiving set screws 31 to lock the nut to the valve box. A riser, generally indicated by the reference numeral 32, comprises an elongated vertical tubular portion 34 provided with external threads 36 which engage the internal threads 28 of the nut. The top of the riser is provided with an upper annular horizontal surface 37 for supporting a cover 38. An annular vertical wall 40 extends to the top of the cover and completely surrounds the cover, so that the cover lies entirely within the confines of the wall.

The riser 32 (shown in FIG. 3) can be used as part of an original valve box installation or as an adapter for an existing installation, in which case, when the riser 32 is used for an existing installation, the wall 40 has the same dimensions as the annular vertical wall 42 normally provided on existing valve boxes for housing the cover. This permits the original valve box cover to be used with the riser. Riser 32 is also provided with an interior annular horizontal shelf 44 located below horizontal surface 37. Cover 38 has an annular horizontal flange 48 which rests on the surface 37 of the riser and an annular vertical flange 46 extending below flange 48 down to surface 44. An annular seal 50 is attached to the bottom edge of flange 46 and extends against the surface 44 and surface 52 to provide a seal between the cover and riser.

Cover 38 has a leveled outer edge 49 at the top and a vertical groove 51 along its outer edge including a recessed portion 53 forming a shoulder 55. A pick or other tool is inserted under shoulder 55 to lift the cover for removal.

The inner surface of wall 40 has a pair of diametrically opposed vertical grooves 57. A special wrench or adjusting tool is inserted into the grooves 57 for rotating the adapter in either direction to raise or lower the adapter to the precise level desired.

Figure 4:
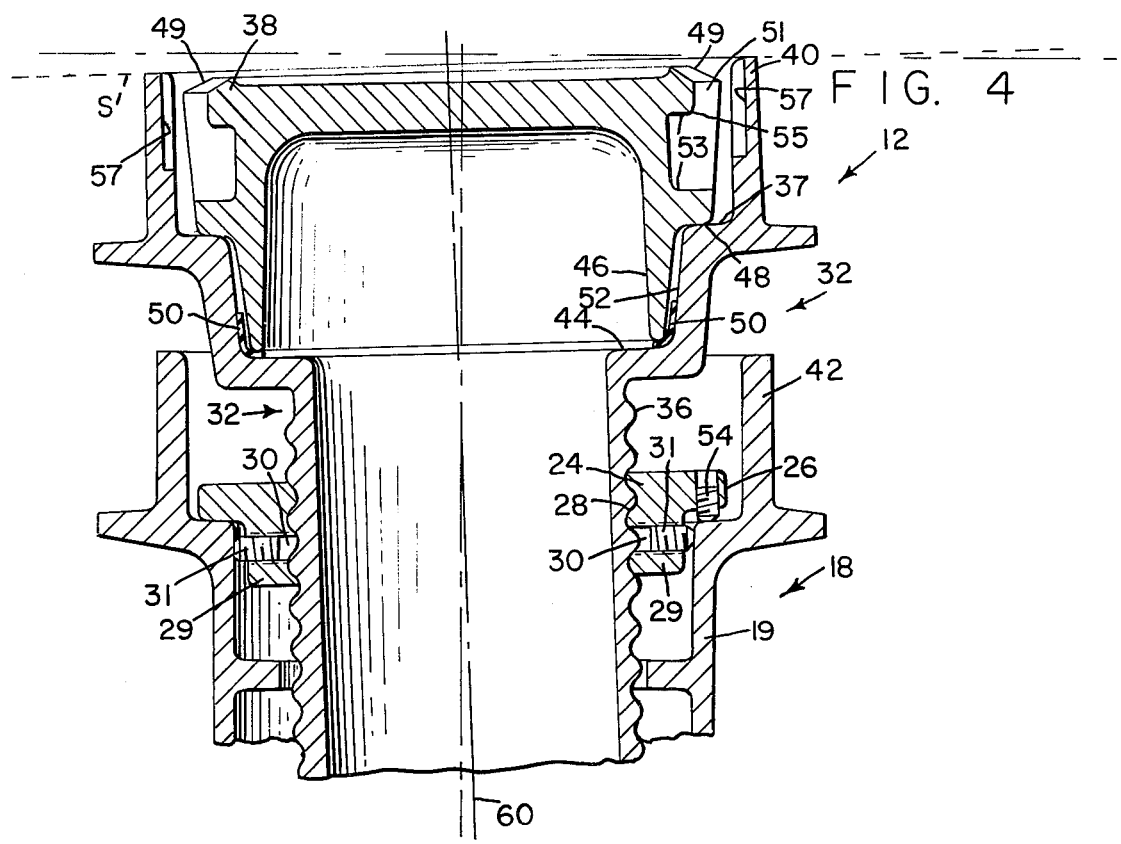
FIG. 4 is a view similar to FIG. 3 showing the riser adjusted for tilt to match a sloping surface.

The nut 24 is provided with a locking screw 54 threaded vertically into flange 26 in contact with surface 22 of the valve box. The screw 54 can be adjusted vertically to raise one side of the nut relative to the other, as shown in FIG. 4. This enables the riser to be tilted relative to the vertical axis of the box, so that the top of the riser and cover may, if necessary, be brought into parallel alignment with a sloping surface indicated at S in FIG. 4. This feature also permits similar adjustment if the assembly is not installed entirely in a vertical aspect.

The operation and advantages of the preferred embodiment will now be readily understood in view of the above description. During an initial installation, the lower portion 20 of the valve box is lowered over the valve 14 to be covered. The upper portion 19 is then slipped over the lower portion 20 and adjusted vertically and the nut 24 is placed upon the surface 22 of the riser and locked in place by means of the screws 31. After that, the riser 32 is threaded into the nut 24 to provide a final vertical adjustment of the valve box assembly to bring the top of the riser into alignment with the road surface and the cover is applied. Finally, the excavation is filled with gravel or other suitable material 56 and covered with an asphalt or a cement layer 58 to match the existing road or sidewalk surface. When the invention is used as an adapter during a resurfacing operation, an excavation is made to the top of the existing valve box and the nut and riser assembly is applied as in the case of an original installation. After the riser has been installed, the old valve cover 38 (or a new cover) is positioned within the wall 40 to close the top of the riser. In FIG. 3 of the drawings, the assembly is shown as divided along the central longitudinal axis 60, so that the left-hand portion shows the extreme low position of the riser and the right-hand portion shows the extreme high position thereof.

Figure 5:
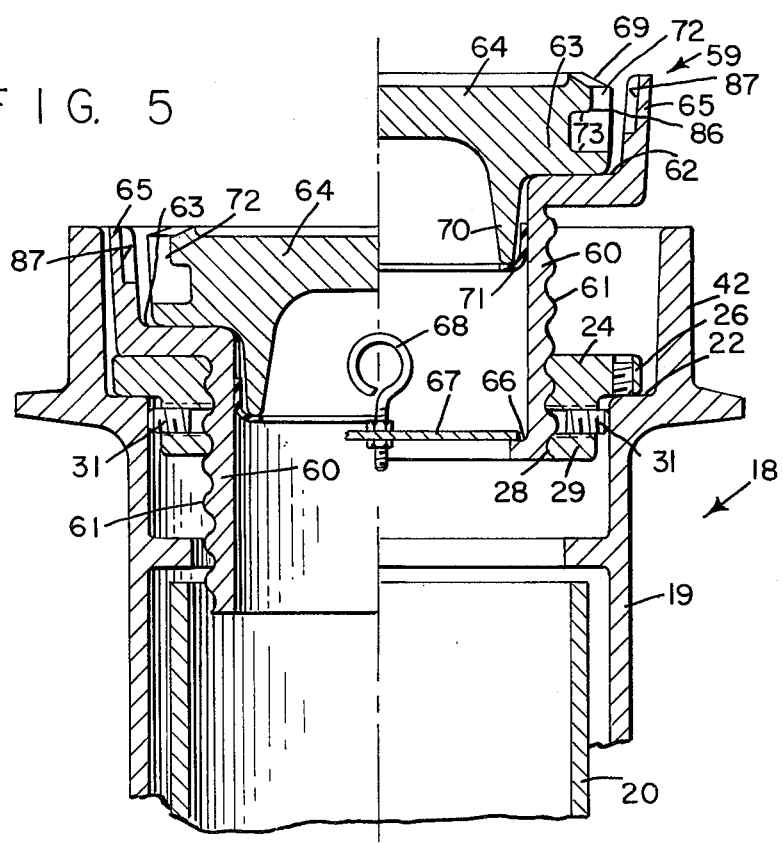
FIG. 5 is a vertical sectional view of a first modification.

Referring next to FIG. 5, there is shown a modified riser, generally indicated by the reference 59, which can be used with the nut 24 and valve box 18 of the preferred embodiment. The riser 59 comprises an elongated tubular vertical portion 60 provided with external thread 61 for engaging the internal threads 28 of nut 24. The upper portion of riser 59 has an upper horizontal surface 62 for supporting the annular horizontal flange 63 of a cover 64 and an annular vertical wall 65 extending upwardly from surface 62 to enclose the cover 64. The diameter and height of wall 65 is such that, when the riser is adjusted to its lowest vertical position, as shown at the left-hand side of FIG. 5, it lies entirely within the annular wall 42 of the valve box. Since the cover 64 fits entirely within the wall 65 of the riser, it is considerably smaller than the original valve box cover. Therefore, when the riser is in its lowest position, (as shown in the lefthand portion of FIG. 5) the top of the cover is aligned with the top of the box cover wall 42 and the original road surface. When the riser 59 is used as an adapter during a resurfacing operation, it will provide infinitely fine vertical adjustment from the original road surface to the extreme upper position shown at the right-hand portion of FIG. 5.

Cover 64 has a leveled outer edge 69 at the top and a vertical groove 72 along its outer edge including a recessed portion 73 forming a shoulder 86 to allow a pick or other tool to be inserted under shoulder 86 to lift the cover for removal. The inner surface of wall 65 has a pair of vertical grooves 87 into which is inserted an adjusting tool for rotating the adapter in either direction to raise or lower the adapter to the precise level desired.

The lower end of riser 59 has an annular inner flange 66 for supporting a flat cover plate 67 with an upwardly, extending hook 68. Plate 67 provides additional protection against debris or other foreign matter from entering the valve box. Cover 64 also has a downwardly-extending annular vertical flange 70 and an annular seal 71, the features being comparable to the flange 46 and the seal 50, respectively, of the preferred embodiment.

Figure 6:
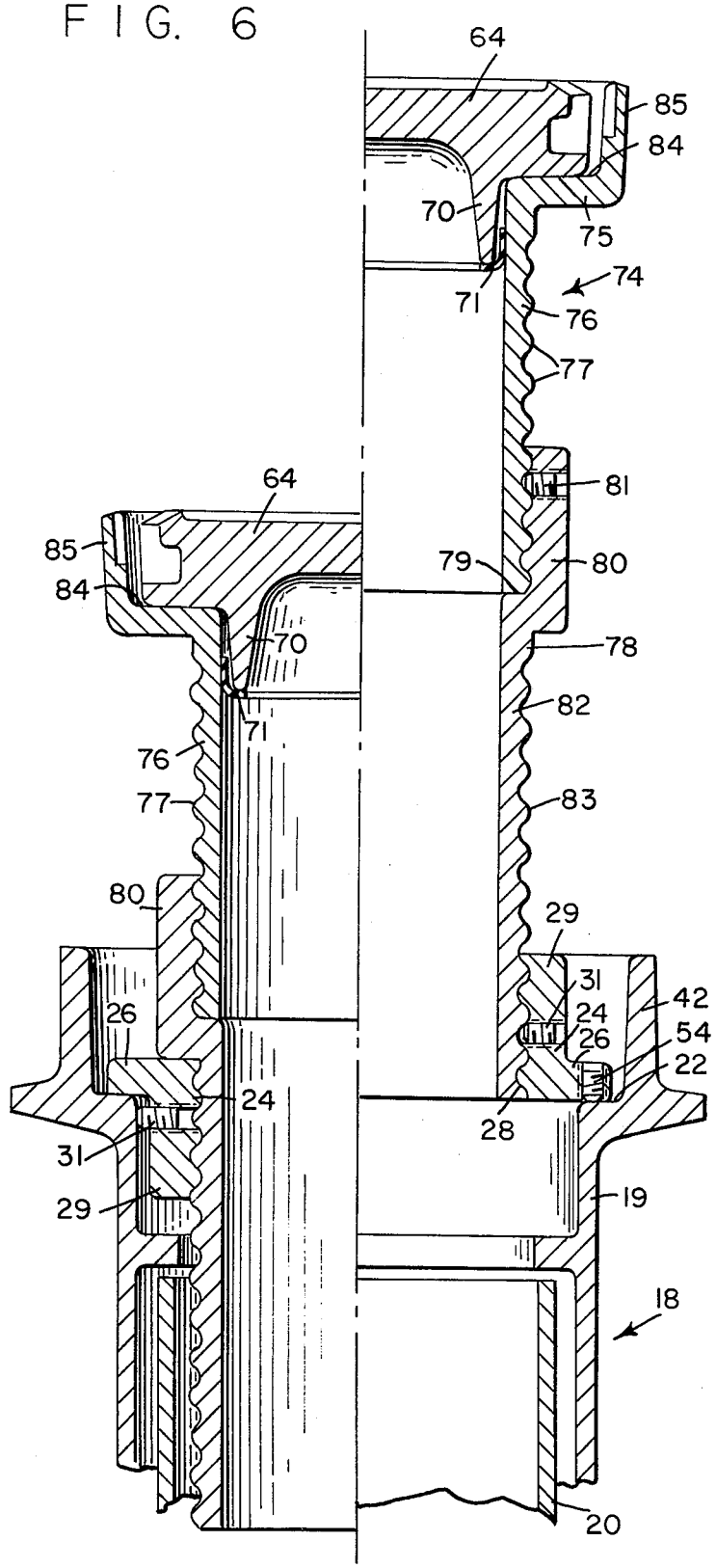
FIG. 6 is a vertical sectional view of a second modification.

FIG. 6 shows a second modified version of the riser, generally indicated by the reference numeral 74, comprising a primary riser 75 and a secondary riser 78. The primary riser 75 has a vertical tubular portion 76 provided with external threads 77. The secondary riser 78 has an upper horizontal annular surface 79 for supporting the lower end of the primary riser 75 and an annular vertical wall 80 extending upwardly from the surface 79 and surrounding a lower portion of the primary riser. A locking screw 81 extends horizontally through the wall 80 for locking the secondary riser to the primary riser. The secondary riser 78 has a vertical tubular portion 82 provided with external threads 83 for threadingly engaging the internal threads 28 of nut 24. The upper portion of riser 74 has an upper annular horizontal surface 84 for supporting the cover 64 of the first modification shown in FIG. 5. An annular vertical wall 85 extends upwardly from surface 84 and surrounds cover 64. In this embodiment the primary riser 75 is similar to riser 59 of FIG. 5 in that, when it is employed without the secondary riser, it is threaded into nut 24. The size of the upper portion of riser 75 is such that, when it is adjusted to its lowest position, wall 85 lies entirely within the wall 42 of the upper valve box, as in the case of the first modification. The secondary riser 78 is employed to provide for additional height adjustment, if necessary, beginning at the height shown in the left-hand portion of FIG. 6 to the upper position shown in the right-hand portion of FIG. 6. The right-hand portion of FIG. 6 also shows that the nut 24 can be inverted from its normal position to provide for maximum height adjustment. Nut 24 can also be inverted when used with the primary riser 75 to bridge the gap between the minimum height position (shown in the left-hand portion of FIG. 6) of the combined pri ary and secondary risers and the maximum height position of the primary riser used alone.

Figure 7:
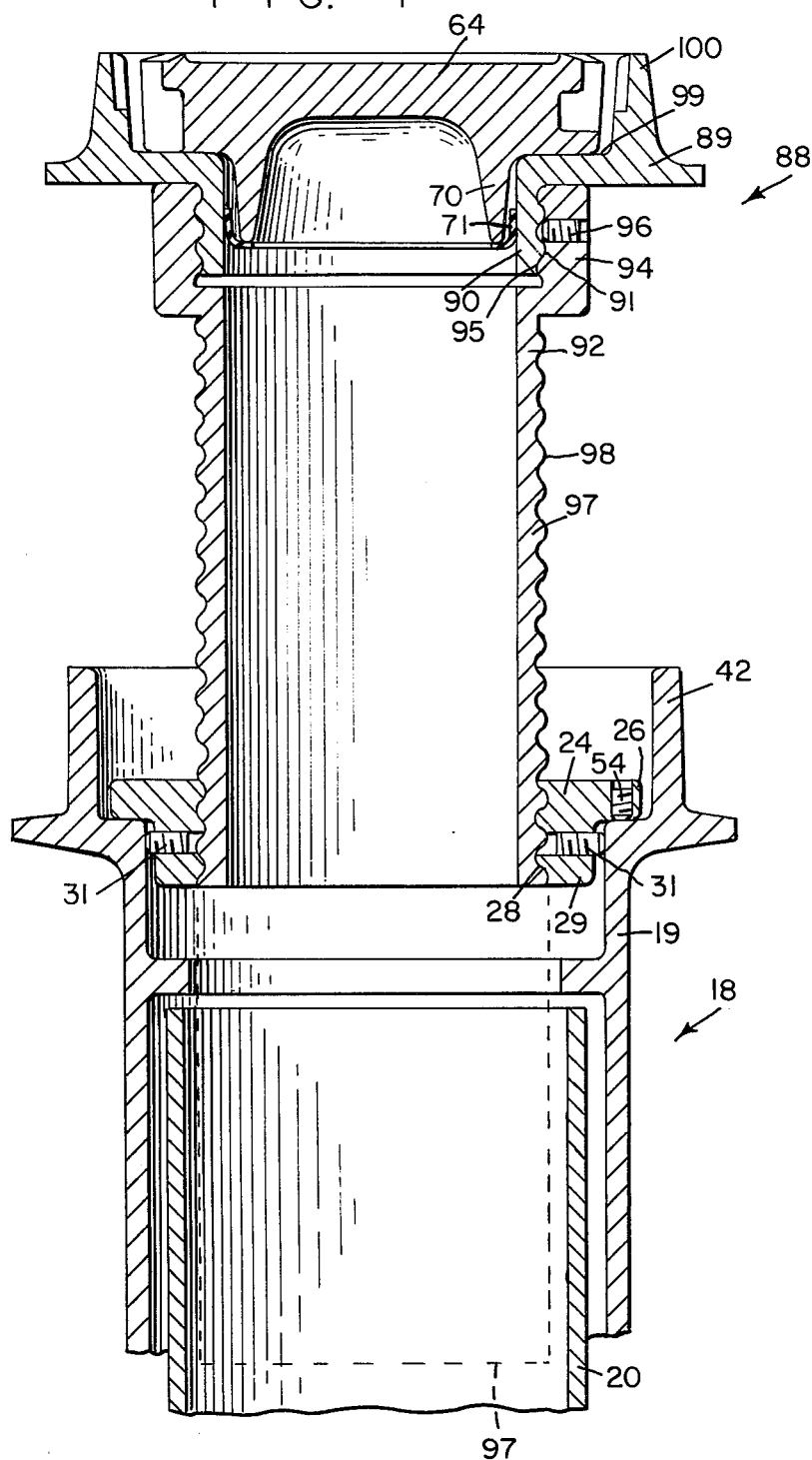
FIG. 7 is a vertical sectional view of a third modification.

Referring to FIG. 7, there is shown a third modified form of riser, generally indicated by the reference numeral 88, comprising a primary riser 89 and a secondary riser 97. Primary riser 89 has a vertical tubular portion 90 provided with external thread 91. Secondary riser 92 has an upper annular vertical wall 94 provided with internal threads 95 for threadingly engaging the external threads 91 of the primary riser. The primary and secondary riser are locked in place by means of a locking screw 96. Secondary riser 92 also has a vertical tubular portion 97 provided with external threads 98 for threadingly engaging the internal threads 28 of nut 24. The upper portion of primary riser 89 is provided with an annular horizontal surface 99 for supporting the cover 64 and an annular vertical wall 100 extending upwardly from surface 99 for enclosing the cover 64. In this embodiment, the secondary riser 97 provides the major vertical adjustment for an original installation or a resurfacing operation. The primary riser provides an additional fine adjustment even after a resurfacing operation or during a subsequent resurfacing operation, enabling the cover 64 to be aligned with the road surface with a minimum of excavation.

Figure 8:
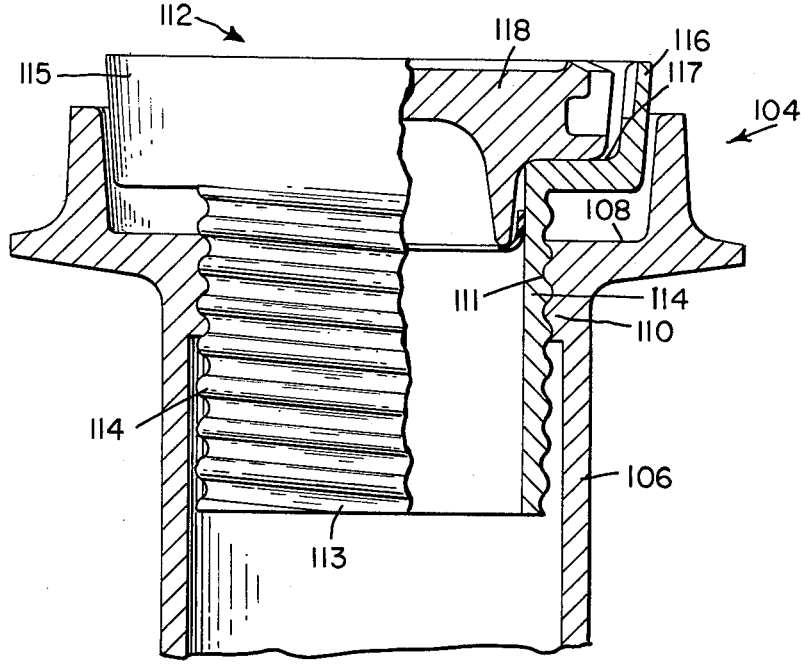
FIG. 8 is a vertical sectional view of a fourth modification.

FIG. 8 shows a fourth modification of the invention in which the entire valve box assembly, indicated generally by the reference numeral 104, is modified for use primarily in new installations or as a complete replacement of an existing valve box assembly. Valve box assembly 104 comprises a valve box 106 and a riser 112. Valve box 106 may comprise a single tubular member or two telescoping members, as in the case of prior art valve boxes. The upper portion of valve box 106 has an upper flat annular surface 108 and an inner annular flange 110 located below surface 108 and provided with internal threads 111. Riser 112 comprises a vertical tubular portion 113 provided with external threads 114, enabling portion 113 to be threaded into the annular flange 110, thereby enabling the riser 112 to be adjusted vertically relative to the box 106. In this embodiment, the upper annular surface 108 of the valve box is not essential, since the riser is supported by the flange 110. However, if the valve box comprises two telescoping sections, the valve box can be installed in a conventional manner and a conventional cover is supported upon the annular surface 108. Riser 112 comprises an annular vertical wall 116 extending upwardly from an annular upper horizontal surface 117. A cover 118 is supported on surface 117. Riser 112 can be installed as part of the initial installation or at a later time as part of a resurfacing operation.

Figure 9:
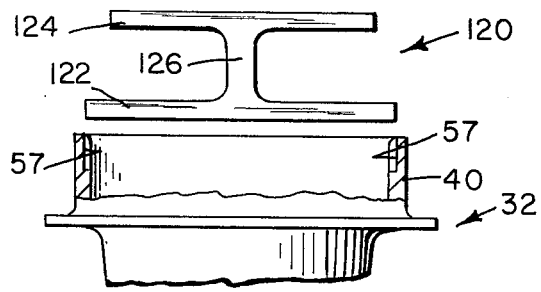
FIG. 9 is a side elevational view of a first adjusting tool for the riser.

Referring to FIG. 9, there is shown a first adjusting tool or wrench for turning the risers of the various embodiments. The first wrench, generally indicated by the reference numeral 120, is H shaped and comprises a pair of elongated parallel bars 122 and 124 connected by a transverse bar 126. As shown in FIG. 9, bar 122 is longer than bar 124 and is adapted to span the inner diameter of wall 40 of riser 32 and extend into the vertical grooves 57. During use, bar 122 is inserted into grooves 57 and the wrench is rotated by grasping and applying torque to bar 124. Bar 124 is adapted for insertion into the similar vertical grooves of the risers associated with the smaller cover 64. In this case the wrench is rotated by grasping and applying a torque to bar 122.

Figure 10:
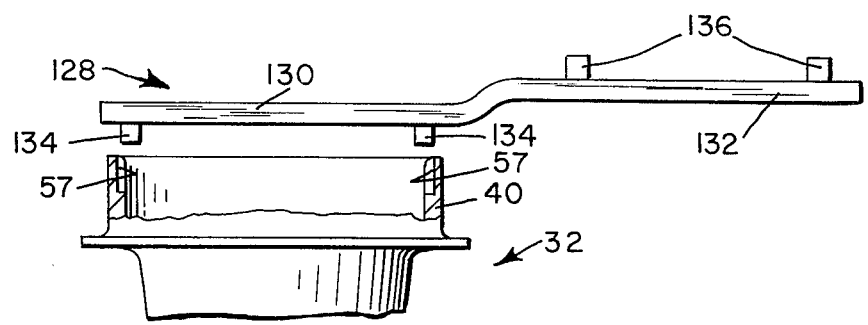
FIG. 10 is a side elevational view of a second adjusting tool for the riser.

FIG. 10 shows a second adjusting tool or wrench, generally indicated by the reference numeral 128. Wrench 128 coprises a single elongated bar divided into two offset portions 130 and 132. A pair of spaced lugs 134 extend transversely from portion 130 and a similar pair of spaced lugs 136 extend transversely from portion 132 but in the opposite direction from lugs 134. Lugs 134 are spaced for simultaneously insertion into grooves 57 of riser 32 and lugs 136 are spaced for insertion into the similar grooves of the risers associated with the smaller cover 64. When the lugs extending from one portion of wrench 128 are inserted into the grooves of the appropriate riser the other portion is used as a lever for turning the risers to provide vertical adjustments thereof.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A valve box assembly for plumbing comprising:
   (a) a valve box having a vertical tubular portion provided with an upper annular substantially horizontal surface, the valve box having an external annular horizontal flange adjacent the upper horizontal surface thereof,
   (b) a nut provided with internal threads and having an annular horizontal flange adapted to rest on the annular upper surface of the valve box, (c) a riser having an elongated vertical tubular portion provided with external threads for threading into the nut, said riser having an upper annular horizontal surface, (d) means for locking the nut to the valve box, and (e) a cover having an annular flange for resting on the upper horizontal surface of the riser, and an annular vertical flange extending downwardly into the riser, the bottom end of the vertical cover flange being spaced from the inside surface of the riser, and (f) an annular seal attached to the vertical flange and extending in a sealing relationship between the vertical flange and extending in a sealing relationship between the vertical flange and inside surface of the riser.

2. A valve box assembly as recited in claim 1, wherein said riser has an interior annular horizontal shelf located below and spaced from the vertical cover flange and said seal also extends into the space between the shelf and vertical cover.

3. A valve box assembly as recited in claim 1, wherein the top of the cover has a beveled outer edge, and a vertical groove along its outer edge.

4. A valve box assembly as recited in claim 1, wherein the riser has an annular vertical wall extending upwardly from the upper horizontal surface thereof and surrounding said cover, the inner surface of said vertical wall having a pair of diametrically opposed vertical grooves to allow insertion of a tool for rotating the riser to provide vertical adjustment of the riser.

5. A valve box assembly as recited in claim 1, wherein the nut is locked to the valve box by a set screw.

6. A valve box assembly as recited in claim 1, wherein said riser comprises an annular vertical wall having a greater radius than said tubular portion and extends upwardly from said upper horizontal for surrounding the cover.

7. A valve box assembly as recited in claim 1, wherein the nut comprises a tubular vertical portion which surrounds the riser and fits inside of the tubular valve box.

8. A valve box assembly as recited in claim 1, comprising a screw extending vertically through the horizontal flange of the nut to provide tilt adjustment of the riser.

9. A valve box assembly for plumbing comrpising:

(a) a valve box having a vertical tubular portion provided with an upper annular substantially horizontal surface, the valve box having two telescoping sections, the two telescoping sections consisting of an upper section including said upper annular surface and a lower section slidably mounted within the upper section, the upper section being provided with an interior annular horizontal flange located below the nut and above the lower section, (b) a nut provided with internal threads and having an annular horizontal flange adapted to rest on the annular upper surface of the valve box, (c) a riser having an elongated vertical tubular portion provided with external threads for threading into the nut, said riser having an upper annular horizontal surface, (d) means for locking the nut to the valve box, and (e) a cover having an annular flange for resting on the upper horizontal surface of the riser, and an annular vertical flange extending downwardly into the riser, the bottom end of the vertical cover flange being spaced from the inside surface of the riser, and (f) an annular seal attached to the vertical flange and extending in a sealing relationship between the vertical flange and extending in a sealing relationship between the vertical flange and inside surface of the riser.

* * * * *